United States Patent
Hastings et al.

(10) Patent No.: US 6,459,895 B1
(45) Date of Patent: Oct. 1, 2002

(54) METHODS FOR MAKING A CELLULAR SYSTEM, TRANSMITTING TO A MOBILE USER IN A CELLULAR SYSTEM, AND EVALUATING THE PERFORMANCE OF A CELLULAR SYSTEM

(75) Inventors: David Hastings; Hyuck M. Kwon, both of Wichita, KS (US)

(73) Assignee: NeoReach, Inc., Rockville, MD (US)

( * ) Notice: Subject to any disclaimer, the term of this patent is extended or adjusted under 35 U.S.C. 154(b) by 0 days.

(21) Appl. No.: 09/669,633

(22) Filed: Sep. 26, 2000

(51) Int. Cl.$^7$ .............................. H04Q 7/20; H04B 1/38
(52) U.S. Cl. ...................... 455/424; 455/562; 455/446; 455/442
(58) Field of Search ................................ 455/562, 423, 455/424, 446, 456, 513, 526, 65, 506, 522, 69, 452, 453, 442

(56) References Cited

U.S. PATENT DOCUMENTS

| | | | | |
|---|---|---|---|---|
| 6,002,935 | A | | 12/1999 | Wang ........................ 455/447 |
| 6,118,767 | A | * | 9/2000 | Shen et al. ................. 455/522 |
| 6,339,708 | B1 | * | 1/2001 | Wang ........................ 455/452 |
| 6,281,840 | B1 | * | 8/2001 | Miyoshi et al. ............ 455/562 |
| 6,321,082 | B1 | * | 11/2001 | Katz .......................... 455/562 |
| 2001/0031647 | A1 | * | 10/2001 | Scherzer et al. ........... 455/562 |
| 2001/0046866 | A1 | * | 11/2001 | Wang ........................ 455/446 |
| 2002/0002066 | A1 | * | 1/2002 | Pallonen .................... 455/562 |

OTHER PUBLICATIONS

Wang, Li–Chun "A New Cellular Architecture Based on an Interleaved Cluster Concept", IEEE Transaction on Vehicular Technology, vol. 48, No. 6, Nov. 1999.

* cited by examiner

Primary Examiner—William Trost
Assistant Examiner—Rafael Perez-Gutierrez
(74) Attorney, Agent, or Firm—Piper Rudnick LLP; Steven B. Kelber; James M. Heintz

(57) ABSTRACT

A cellular architecture includes antenna arrays that are arranged to reduce soft handoff areas, thereby increasing system performance. The arrays are arranged such that each of the arrays are aligned along one of a plurality of parallel lines in a first direction at a regularly spaced interval, each of the arrays on a single line in the first direction having a same orientation, each of the arrays along adjacent parallel lines being staggered with respect to a nearest neighboring array in a second direction such that the second direction forms an angle of approximately 10.89 degrees with respect to a direction perpendicular to the first direction. In preferred embodiments, the orientation of arrays along adjacent parallel lines is rotated by sixty degrees with respect to each other. The architecture is particularly well-suited to CDMA systems. In preferred embodiments including smart antenna arrays, transmission to mobile users occurs along a primary multipath and two secondary multipaths. A method for determining performance of cellular systems by calculating the asymptotic capacity is also provided.

39 Claims, 10 Drawing Sheets

METHODS FOR MAKING A CELLULAR SYSTEM, TRANSMITTING TO A MOBILE USER IN A CELLULAR SYSTEM, AND EVALUATING THE PERFORMANCE OF A CELLULAR SYSTEM

BACKGROUND OF THE INVENTION

1. Field of the Invention

The present invention relates to wireless telecommunications. More particularly, the present invention relates to a new cellular architecture for cellular systems such as Code Division Multiple Access (CDMA) Smart Antenna Array Systems.

2. Description of the Related Art

In wireless communications systems, including second generation (2G) and third generation (3G) systems, a viable option for improving system capacity is to employ a smart antenna array in both the forward link (from the base station to the mobile) and the reverse link (from the mobile to the base station). As used herein, the term smart antenna refers to an antenna that can detect the angle at which a signal is received, and that can transmit a focused beam in a desired direction or directions as well as selectively receive a transmitted signal from a desired direction or directions. In the reverse link, the base station can achieve improved capacity by suppressing the interfering signals from different direction of arrival angles (DOAs) by using spatial diversity. In the forward link, the base station can use the DOA capabilities of the reverse link system to focus a directional beam to a user at any given angle and suppress the signal to other users.

One side effect of smart antenna arrays is the non-uniform gain pattern that results in a multi-user interference environment. When a cluster of cells is arranged in the conventional Wide Beam Tri-sector Cell ("WBTC") architecture, the result is a large soft handoff region which can degrade the system leading to reduced capacity.

What is needed is a new architecture for cellular systems employing smart antennas in which the soft handoff area is reduced relative to the conventional WBTC architecture.

BRIEF SUMMARY OF THE INVENTION

The new cellular architecture is called the Interleaved Wide Beam Tri-sector Cell (IWBTC) architecture in which base stations have an orientation and are arranged in a regular pattern based on a three sector cell with each sector in the shape of a hexagon. In this architecture, neighboring base stations are aligned in a first direction and staggered, preferably by approximately 10.89 degrees, in a second direction perpendicular to the first direction. In addition, neighboring base stations in the first direction have the same orientation, while neighboring base stations in the second direction are rotated by approximately sixty degrees with respect to each other. The architecture of the invention may be used in any cellular system, but is particularly well suited to CDMA systems which do not use frequency division (that is, in CDMA systems in which neighboring base stations transmit over the same range of frequencies), and which employ smart antennas. The architecture takes advantage of the smart antenna array characteristics (when CDMA base stations employ the smart antenna array in the forward and reverse channels), resulting in a significantly decreased soft handoff area and thus a significant improvement as compared to the conventional WBTC architecture.

In another aspect of the invention, a system and method for evaluating cellular architecture performance are provided. In the method, equations for defining the smart antenna array are provided, then the interference is calculated, and finally an equation for asymptotic capacity is provided to compare the performance of the IWBTC and WBTC architectures.

In still another aspect of the invention, the smart antenna is used to direct a transmission to a mobile user in three different directions: a first direction on which the signal strength received from the mobile unit is highest (the "primary multipath"), as well as the directions on either side of the first direction on which the next-highest signal strength is received (the "secondary multipaths"). In preferred embodiments, one half of the transmitted power is directed toward the primary multipath, while one quarter of the transmitted power is directed toward each of the two secondary multipaths.

BRIEF DESCRIPTION OF THE DRAWINGS

These and other features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMOBDIMENT

Figure 1:
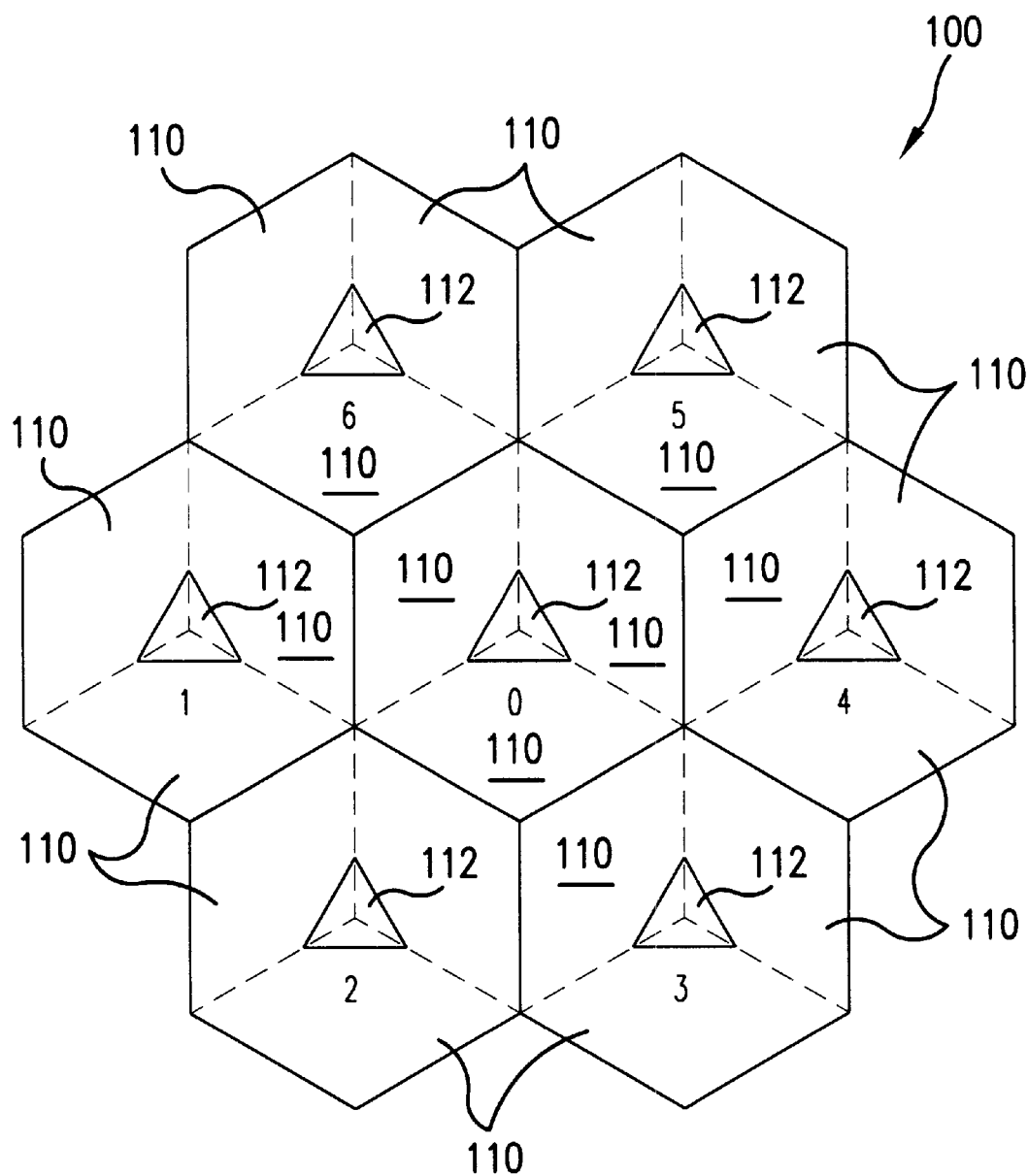
FIG. 1 is a schematic drawing showing a cluster of cells in the WBTC architecture according to a conventional architecture.

The present invention will be discussed with reference to preferred embodiments of cellular architectures and systems and methods for evaluating the same. Specific details, such as the number of elements in a smart antenna, etc., are set forth in order to provide a thorough understanding of the present invention. The preferred embodiments discussed herein should not be understood to limit the invention.

Referring now to the drawings, wherein like reference numerals designate identical or corresponding parts throughout the several views, FIG. I illustrates a conventional WBTC cellular architecture 100 including 7 hexagonal cells numbered 0–6. Each hexagonal cell 0–6 includes three diamond-shaped sectors 10. The triangle 112 in the middle of each hexagonal cell 0–6 represents a smart antenna array such as the antenna arrays described in co-pending U.S. application Ser. No. 09/610,470, filed Jul. 5, 2000, entitled "Smart Antenna with Adaptive Convergence Parameter,") and co-pending application Ser. No. 09/661,155, filed Sep. 13, 2000, entitled "Smart Antenna with No Phase Calibration for CDMA Reverse Link". The contents of both of these applications are hereby incorporated by reference herein. In preferred embodiments, each antenna array 112 is three sided, with each side including two or more antenna elements. In highly preferred embodiments, the elements are arranged linearly. It will be recognized by those of skill in the art that it is possible to arrange the elements in a rectangular, circular or patch arrangement. Each side of the antenna array 112 corresponds to a sector 110 in a cell 0–6. Cell boundaries are indicated by solid lines in FIG. 1, while sector boundaries are indicated by dashed lines.

Figure 3:
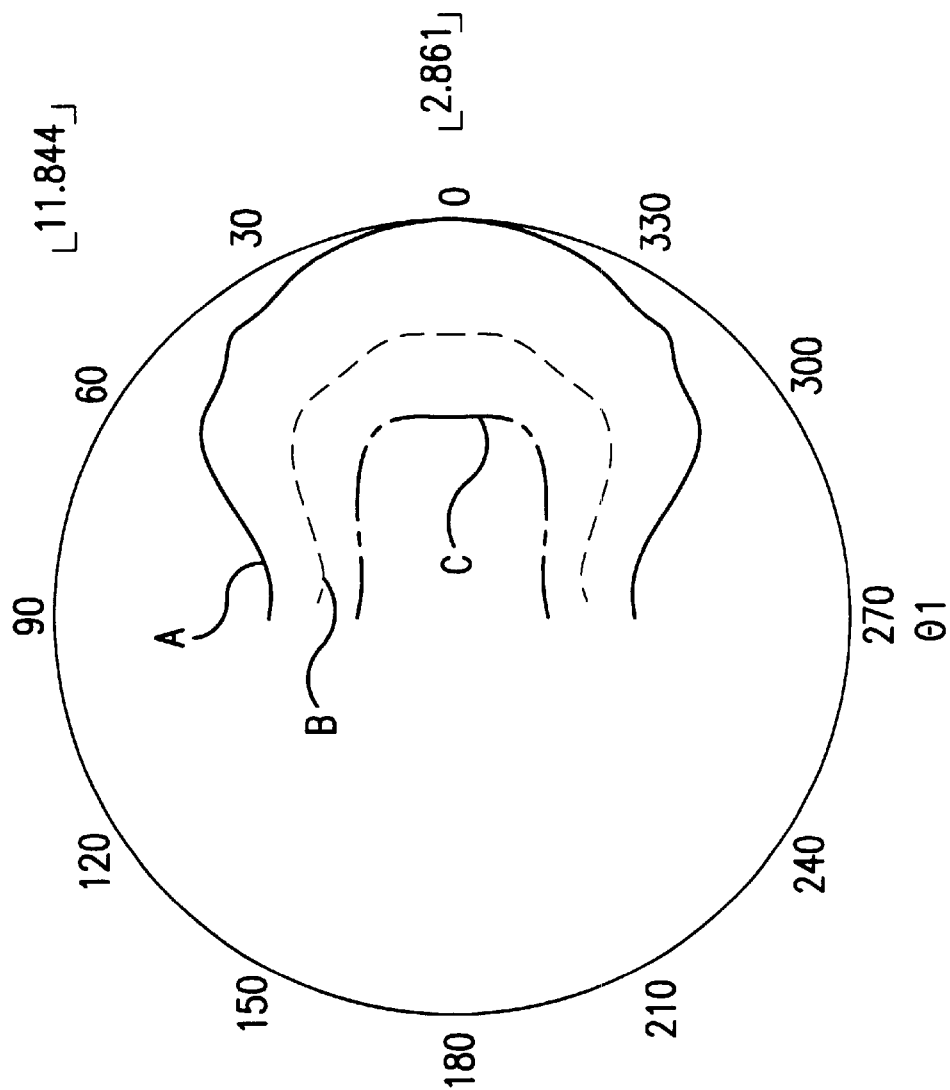
FIG. 3 is a polar plot showing average gains of a smart antenna due to interference suppression.

The average gain pattern of an exemplary smart antenna array 112 is illustrated in FIG. 3. In the polar plot of FIG. 3, the lines A, B, C correspond to 10 element arrays, 5 element arrays, and 3 element arrays, respectively. As can be seen in FIG. 3, especially for the 10 element case, the smart antenna array 112 provides an average gain pattern that covers 120 degrees, which is the same coverage provided by antennas referred to in the art as wide beam antennas. Accordingly, smart antennas 112 have heretofore typically been employed using wide beam architectures such as the WBTC architecture 100 shown in FIG. 1.

Figure 4:
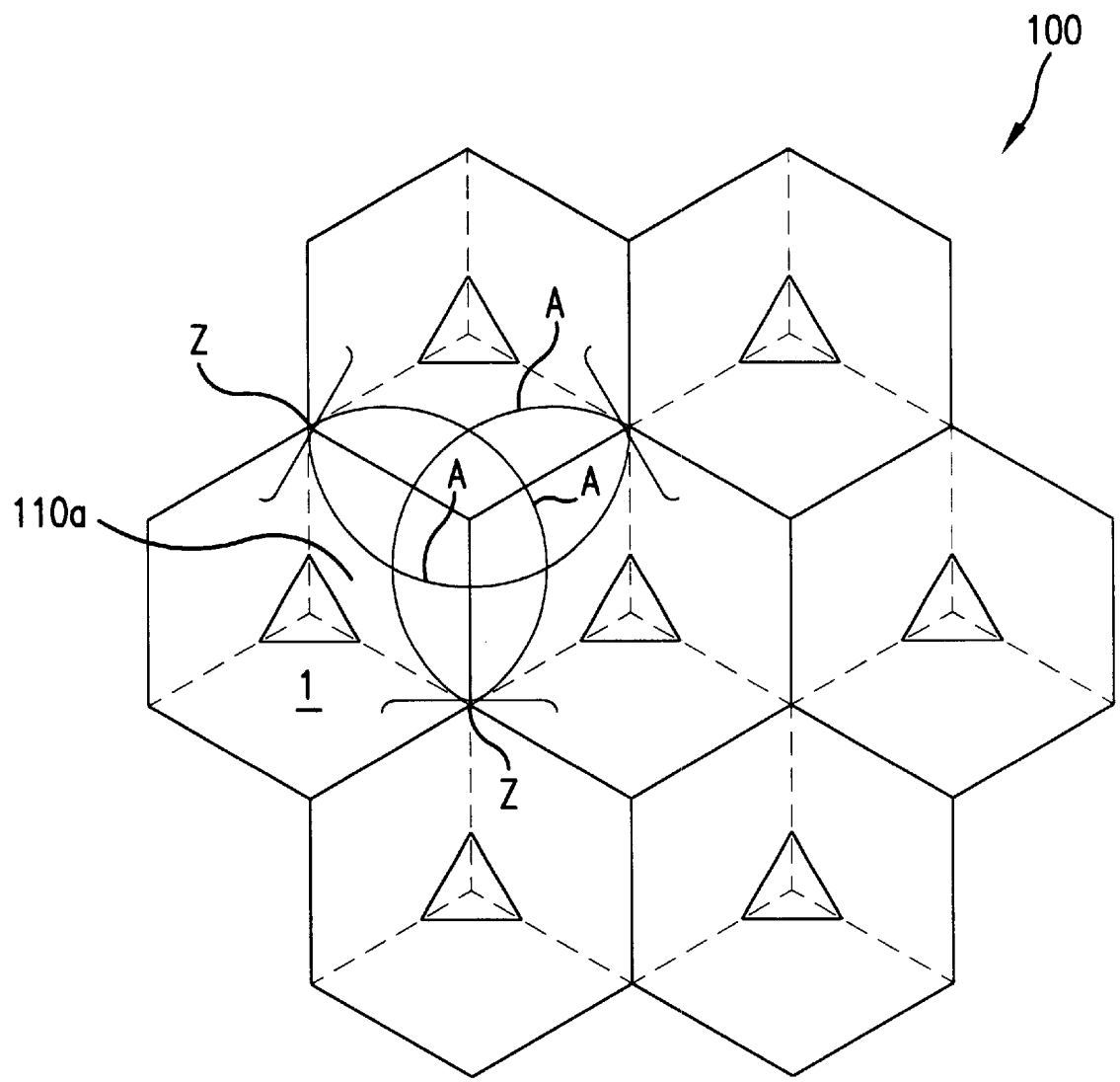
FIG. 4 is a schematic diagram, similar to FIG. 1, showing the antenna coverage of several contiguous cells of the WBTC architecture.

FIG. 4 illustrates the average gain pattern A of FIG. 3 superimposed over the WBTC architecture 100 of FIG. 1. In order to ensure sufficient coverage in sector 110a of cell 1, it is necessary to ensure that the average gain A extends completely to the corners Z of sector 110. However, this results in large overlap areas (also referred to herein as soft handoff areas), between adjacent gain patterns A. As shown in greater detail below, these large soft handoff areas degrade system performance.

Figure 2:
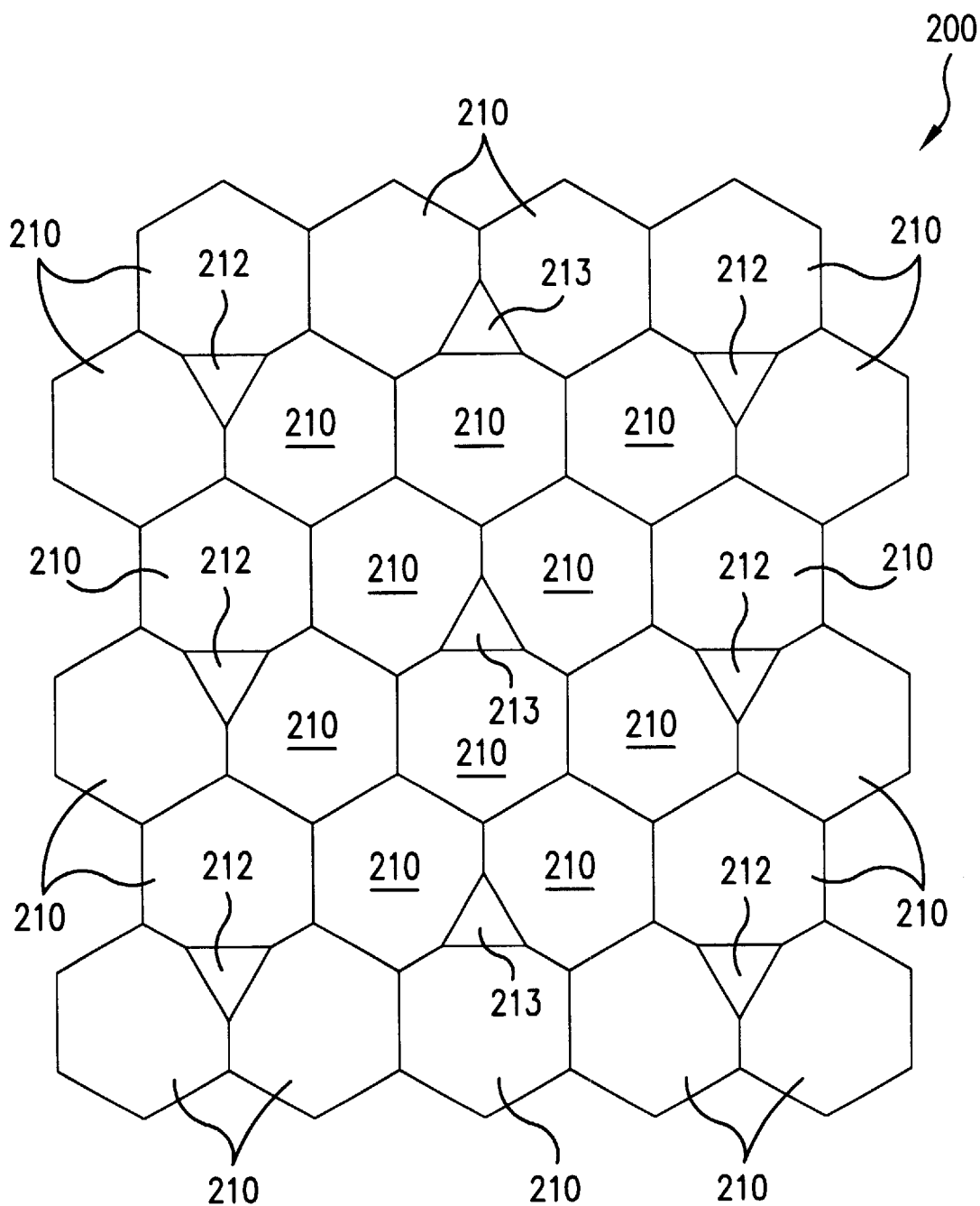
FIG. 2 is a schematic diagram showing a cluster of cells in the IWBTC architecture according to the present invention.
Figure 9:
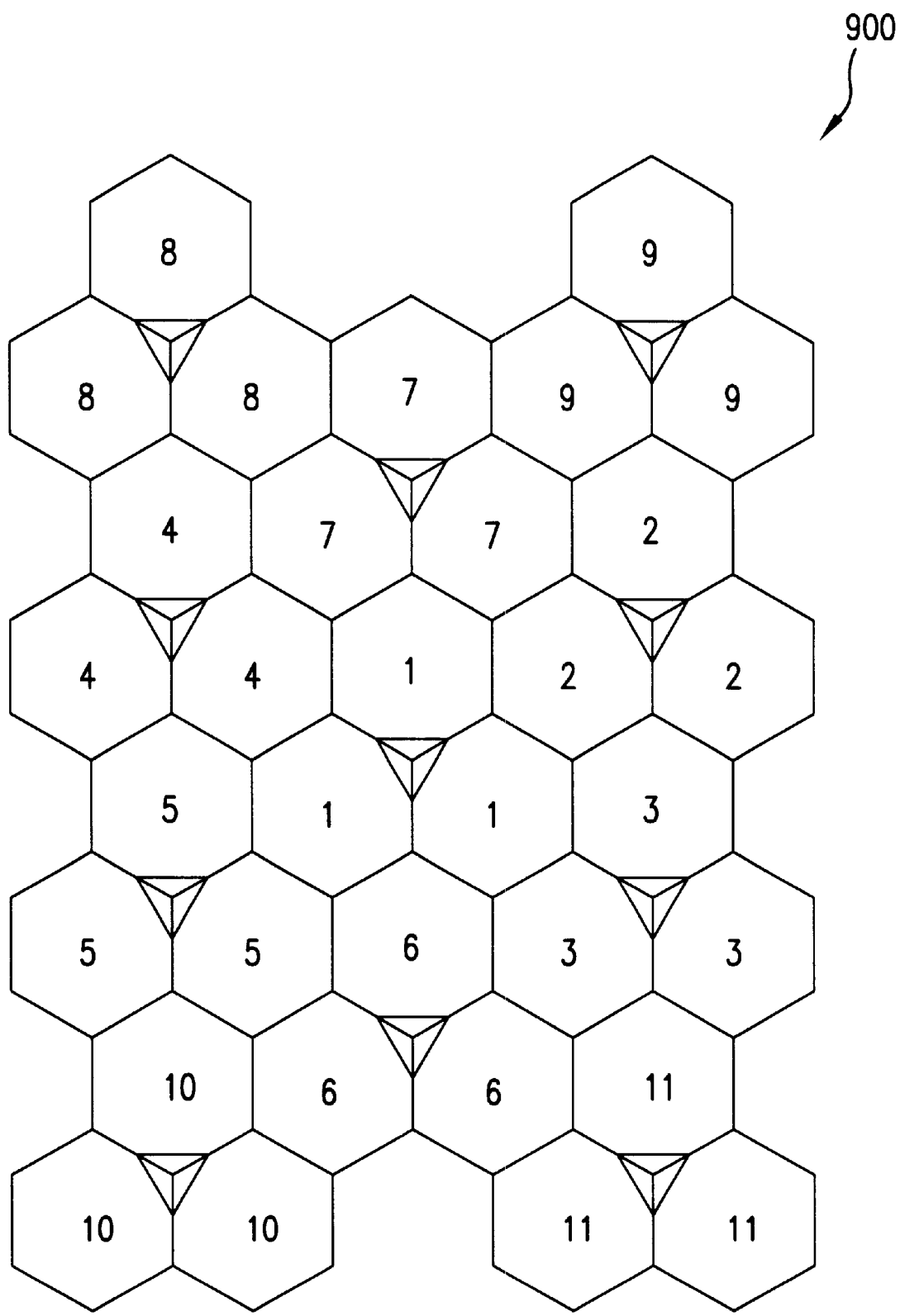
FIG. 9 is a schematic diagram of a non-rotated wideband hexagonal cell architecture.
Figure 10:
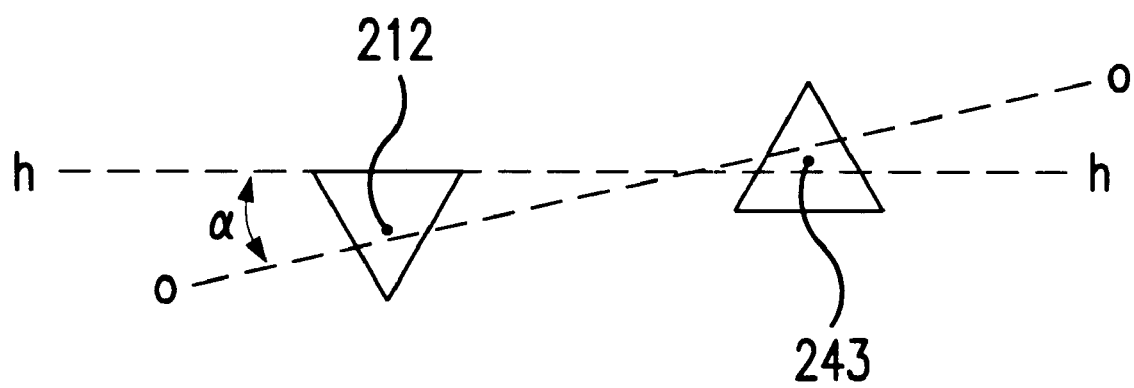
FIG. 10 is a schematic diagram showing an offset angle between two smart antennas.

FIG. 2 shows the IWBTC architecture 200 of the present invention where cells are organized in an interleaved structure called the Interleaved Wide Beam Tri-sector Cell (IWBTC) architecture according to the present invention. In FIG. 2, each cell comprises 3 hexagonal sectors 210 corresponding to a base station including a smart antenna array 212, 213. Each hexagonal sector 210 is a regular hexagon with all sides and all angles between sides being equal. Each of the arrays 212 are arranged in a substantially straight column, as are each of the arrays 213. However, each of the arrays in any one column are rotated about the center of the cell by approximately 60 degrees with respect to neighboring arrays in the two adjoining columns. The rotation provides slightly better performance as compared to an architecture in which the arrays are not rotated, such as the architecture 900 of FIG. 9. Furthermore, although the arrays 212, 213 are arranged in straight columns, the rows formed by the arrays are not straight. Due to the shape of the hexagonal sectors (which are regular hexagons), neighboring arrays are offset. Preferably, due to the assignment of the antenna arrays to the sectors, neighboring antenna arrays in a row are offset by an angle a of approximately 10.89 degrees with respect to the horizontal direction h, as illustrated in FIG. 10. This angle may be calculated using ordinary principles of geometry. Those of skill in the art will recognize that this angle may be different by as much as several degrees. Differences may result from requirements improved by practical concerns such as the inability to locate an antenna exactly where desired.

Figure 5:
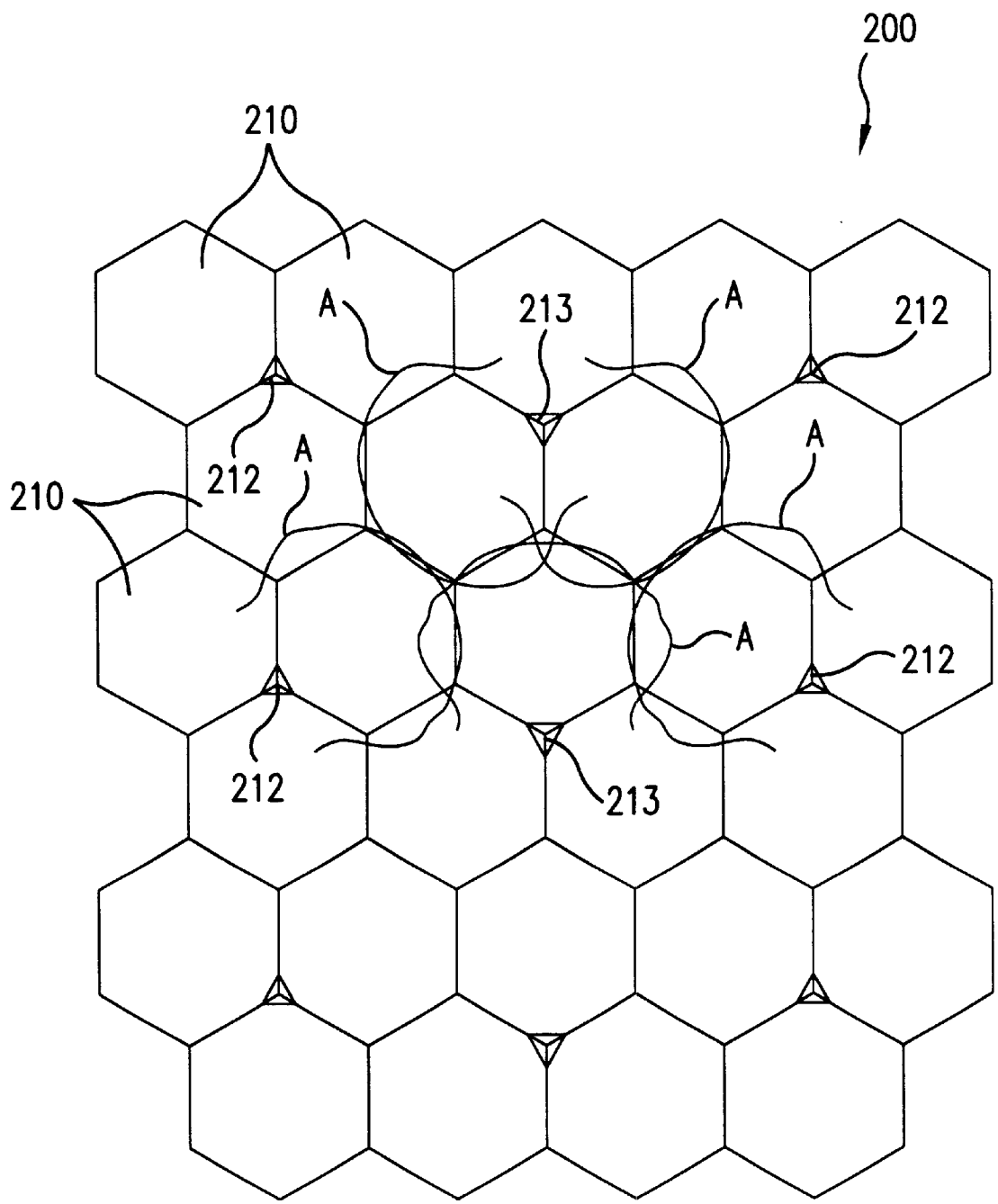
FIG. 5 is a schematic diagram, similar to FIG. 2, showing the antenna coverage of several contiguous cells of the IWBTC architecture.

The architecture 200 described above in connection with FIG. 2 results in a greatly reduced soft handoff region, as illustrated in FIG. 5. In a manner similar to FIG. 4, FIG. 5 illustrates the average gain pattern A of FIG. 3 superimposed over the IWBTC architecture 200 of FIG. 2. It is obvious from a comparison of FIGS. 4 and 5 that the soft handoff areas in FIG. 5 are greatly reduced relative to FIG. 4. Table 1 shows the fractional portion of the soft handoff area compared to the sector area size. For example, when a 10 element smart antenna array is used, the WBTC architecture has a soft handoff area equal to 70% of its sector area where as the IWBTC architecture has an area equal to about 18%. As a result in the decrease in soft handoff area size, the IWBTC architecture results in a significant improvement in performance as compared to the conventional WBTC architecture.

TABLE 1

Soft handoff area, $M_{ho}/M_t$, for the WBTC and IWBTC architectures for 3, 5, and 10 antenna elements.

| Antenna Elements | WBTC | IWBTC |
|---|---|---|
| 3 | 0.70 | 0.31 |
| 5 | 0.86 | 0.24 |
| 10 | 0.70 | 0.18 |

It should be noted that the IWBTC architecture described herein bears some resemblance to the Interleaved Narrow Band Tri-Cell (INBTC) architecture described in "A New Cellular Architecture Based on an Interleaved Cluster Concept,") IEEE Transactions on Vehicular Technology, Vol. 48, No. 6, November 1999, by Li-Chun Wang ("Wang"). However, there are several important differences between the two systems. First, Wang's architecture employs a 60 degree directional narrow beam antenna, while the present invention employs a smart antenna array, wherein each of the 3 sides of the antenna array is comprised of several omni-directional antenna elements. The smart antenna has an average gain pattern that is generally considered to be wide beam. Second, the only reason provided by Wang for rotating antenna arrays by sixty degrees deals with frequency reuse considerations, which are applicable to cellular systems other than CDMA. There is no recognition by Wang of the tie between soft handoff area size and system performance and no discussion in Wang of improving system performance by reducing soft handoff area size. Nor is there any discussion in Wang of the improvement in reducing soft handoff size area realized as a result of rotating antenna arrays. In contrast to Wang, the present invention is particularly useful for CDMA systems, in which neighboring base stations transmit over the same range of frequencies (i.e., there are no frequency reuse concerns). Still further, there is no suggestion in Wang for employing a smart antenna to transmit to a mobile unit on three multipaths as described further below.

In accordance with the invention, the following describes the mechanism used to evaluate the performance of the various architectures for comparison. First the smart antenna array is defined, then the interference is derived, and finally an equation for the asymptotic capacity is derived to compare the performance of the two architectures.

Since the base station determines when the mobile is handed off based on the received FER (Frame Error Rate), the method for finding the handoff boundary is to find the location where the loss to the given cell exceeds the loss to the adjacent cell. The following equation provides this:

$$Range(r, \theta) = \frac{r_1^4}{G_{avg}(\theta_1)} - \frac{r_2^4}{G_{avg}(\theta_2)} \qquad (5)$$

where $r_1$ is the distance to the given base station, $r_2$ is the distance to the adjacent base station, $G_{avg}(\theta)$ is the average suppressing gain of the antenna array, $\theta_1$ is the angle from the perpendicular of the antenna array of the given base station to the user, and $\theta_2$ is the angle from the perpendicular of the adjacent antenna array to the user.

Preferred embodiments of the present invention use a smart antenna array that can be described as follows: The antenna array response vector for $M_{ant}$ antenna elements can be written as:

$$a(\theta) = \left[1 \ e^{-\frac{j2\pi d\sin\theta}{\lambda}} \ \ldots \ e^{-\frac{j(M_{ant}-1)2\pi d\sin\theta}{\lambda}}\right]^T \qquad (1)$$

where $M_{ant}$ is the number of antenna elements, T is the transpose, and $\theta$ is the incident angle called DOA from a user. The antenna elements are assumed to be spaced at $d=\lambda/2$ (one-half wave length) apart. Let $\theta_1$ be the DOA from the desired user. The optimum weight vector resulting from the adaptive algorithm from "Computationally Efficient Smart Antennas for CDMA Wireless Communications," submitted to the IEEE Transactions on Vehicular Technology, March 2000 by Song and Kwon ("Song and Kwon"), the contents of which are hereby incorporated herein by reference, can be approximately written as:

$$\underline{W}(\theta_1) = [1 \ e^{-j\pi\sin\theta} \ \ldots \ e^{-j\pi(M_{ant}-1)\sin\theta_1}]^T. \qquad (2)$$

This form of the weighting will be true when the adaptive antenna system finds the angle that maximizes the received power of the mobile. In a smart antenna array system, the average suppressing gain over the uniformly distributed interference for the desired user on the reverse channel, can be found from Song and Kwon as:

$$G_{avg}(\theta) = \frac{1}{\pi}\int_{\frac{\pi}{2}}^{\frac{\pi}{2}} \frac{1}{M_{ant}^2}|\underline{W}^H(\theta)\underline{a}(\theta_n)|^2 \, d\theta_n \qquad (3)$$

where the weight vector, $W^H$, resulting from the blind adaptive algorithm is for the desired signal DOA of $\theta$, H represents the Hermitian of the vector which is simply the complex conjugate of the transpose of the vector, $\theta_n$ is the DOA of the undesired user, $\underline{a}(\theta_{d\ n})$ is the array response vector for the undesired signal of DOA $\theta_n$, and $M_{ant}$ is the number of antenna elements. This gain can then be plotted for all expected directions of the desired user arrivals. FIG. 3 shows the average gain of the smart antenna verses the direction of desired user signal arrival for 3, 5, and 10 antenna elements in a polar chart. FIG. 3 shows 10 $Log_{10}$ (1/Gain($\theta$)), where levels are in dB. It can be seen that as the DOA reaches the outer edges of the sector (±60°), the average gain decreases. The problem is particularly pronounced in the three-antenna element case. The five-antenna element case is somewhat better and the ten-antenna element configuration has the best coverage verses DOA.

For the forward channel, the beam pattern can be assumed to be the same as the reverse channel in the ideal case. The forward channel interference will be derived from the smart antenna array beam power. From "Song and Kwon", the following equation describes the beam power:

$$Power(\theta, \theta_n) = \frac{|\underline{W}^H(\theta)\underline{a}(\theta_n)|^2}{M_{ant}^2} \qquad (4)$$

where $\theta$ is the angle of the transmit beam and $\theta_n$ is the DOA of user n. The beam power is normalized to 1 for the forward channel transmission from the base station. It has been shown that the number of users that can be nulled is equal to $M_{ant}-1$, where $M_{ant}$ is the number of antennas. This invention assumes there are more users or signals than antenna elements where not all users can be nulled. Under these assumptions there will be insufficient suppression of undesired multipaths which add to the overall interference. It is assumed that the users in the system do not have smart antennas and that all the base stations in the system have smart antennas that are used in both the forward and reverse links.

The forward channel capacity is based on the signal-to-interference power ratio (SIR) received at the mobile. The source of interference is multipath from the same cell base station and from other cells. This interference derivation assumes orthogonal channels transmitted from the base such that under no multipath, there is no co-channel interference. It is assumed that the major contribution to interference is multipath signals. It is also assumed that the forward channel weighting vectors can be determined without errors based on the receiver weighting vectors. The base transmits on multiple DOA to each user. Each channel transmitted from the base station is assumed to be orthogonal and the source of the same cell interference is multipath.

In a smart antenna environment where the forward channel signal is beam formed toward the desired user, the interference to that user will be the amount of signal transmitted toward him that was intended for other users. Therefore, the key to finding the amount of interference is in determining the amount of signal transmitted toward the desired user due to all other users. The same cell and other cell interference will then be derived from these results. The single cell transmit power will be shown first for the 1-path case assuming the base station only transmits in one direction for each user. Then the 3-path case will be shown where the base station transmits to all users on 3 multipaths. The total power transmitted with 1-path for each user to a user at angle $\theta$ due to n users in the same cell can be defined as:

$$P_{1Cell,1path}(\theta) = \sum_{i=1}^{n} \frac{|\underline{W}^H(\theta)\underline{a}(\theta_i)|^2}{M_{ant}^2} \qquad (5)$$

where $\theta$ is the angle at which we are calculating the power to the desired user and $\theta_i$ is the angle at which the base is transmitting to user i. Although the majority of the power transmitted toward a user is focused, the "tail" contributes interference toward other users. The single cell forward link power received at the mobile in the absence of interference is normalized to 1 for these equations. For a base station transmitting on three paths for each user, a power profile of 50%, 25%, and 25% is assumed in the present invention without loss of generality. Then, the power becomes:

$$P_{1Cell,3path}(\theta) = \qquad (6)$$

$$\frac{1}{2}\left(\sum_{i=1}^{n}\frac{|\underline{W}^H(\theta)\underline{a}(\theta_i)|^2}{M_{ant}^2}\right) + \frac{1}{4}\left(\sum_{i=1}^{n}\frac{|\underline{W}^H(\theta)\underline{a}(\theta_i + \theta_{subpath1})|^2}{M_{ant}^2}\right) +$$

$$\frac{1}{4}\left(\sum_{i=1}^{n}\frac{|\underline{W}^H(\theta)\underline{a}(\theta_i + \theta_{subpath2})|^2}{M_{ant}^2}\right).$$

With this approach the primary DOA would carry 50% of the path power and the 2 other paths would carry 25% each compared to the 1-path case in equation (5). For the simulation results presented here, it is assumed that the two sub-paths are located ±10° away from the primary path.

Using the solutions presented in equations (5) and (6), the same cell and other cell interference factors can be found. It is accepted that, for the single antenna case, the same cell interference may be set to the signal strength of the primary desired multipath. This interference can be quantified into an interference factor ($K_{same}$) independent of the number of users in the system. The same cell interference factor represents the relative interference power compared to the same cell signal level, $S(\theta)$, received at the mobile:

$$\frac{I_{sc}}{S(\theta)} = K_{same}, \qquad (7)$$

where $I_{sc}$ is the same cell interference power for either the 1-path case or the 3-path case. The denominator, $S(\theta)$, can be defined as $$S(\theta) = \frac{P(\theta)}{r^\gamma} \qquad (8)$$

where r is the distance from the cell to the mobile and γ is the power law used. For all simulations in this invention, the power law used is 4 without loss of generality. If the same cell interference is assumed to be equal to the primary desired multipath, $S(74)$, then $K_{same}=1$. For the smart antenna case, this assumption will be made for the same cell interference factor.

To determine the other cell forward channel interference, it is assumed the same levels are transmitted from all other cells. The main factor in this case is the angle of arrival of the signal and the distance from the cell to the desired mobile. The following equation can be used to find this value for the single antenna case:

$$I_{oc} = \sum_i \frac{1}{r_i^\gamma(r, d_i, \theta_i)} \qquad (9)$$

where $r_i$ is the distance to the i-th base station. This assumes the antenna gains are equal which is a valid assumption for the single antenna case. The name used for the other cell interference factor is $K_{other}$. For the smart antenna array system, equation (9) becomes:

$$I_{oc,SA} = \sum_i \frac{P_{1Cell}(\theta_{oc})}{r_i^\gamma(r, d_i, \theta_i)} \qquad (10)$$

where $\theta_{oc}$ is the angle from the other cell to the desired user relative to its antenna array, and $P_{1Cell}$ represents either the 1 path or the 3 path single cell interference of equation (5) or (6), respectively. The reason for the expression of the other cell interference in this form is that the primary difference between the same cell and the other cell interference is the distance from the base station to the user. Therefore the amount of interference from all other cells is reduced by the power law, γ, of the distance from that cell to the user. To find the ratio of the other cell interference to the same cell desired power, $K_{other}$ is calculated as $$\frac{I_{oc,SA}}{S(\theta_{sc})} = \sum_i \frac{P(\theta_{oc})r^\gamma}{P(\theta_{sc})r_i^\gamma(r, d_i, \theta_i)} = K_{other} \qquad (11)$$

where $S(\theta_{sc})$ is the total forward link power received at the mobile from the reference cell without interference, and r is normalized to 1. The worst case would be the location furthest from the given cell while still remaining in the cell, just before handoff.

To provide simulation results for the other cell interference, $K_{other}$ is calculated for the two different sector architectures described in FIGS. 1 and 2. In Tables 2 and 3, the value of $S(\theta)$ is averaged over θ and represents the total forward link power received at the mobile from the reference base station in the absence of interference. This value can be calculated as S=19.202 for a user at the cell edge for a ten-element smart antenna array. The total forward channel interference factor may be defined as:

$$K_f = K_{same} + K_{other}. \qquad (12)$$

Smaller values of $K_f$ translate into lower interference. Table 2 shows the calculated other cell interference for the WBTC architecture resulting in $K_{other}=1.246$. With $K_{same}=1$ the resulting $K_f$ for the WBTC case is 2.246 for the 3-path case. Table 3 shows the calculated other cell interference for the IWBTC architecture resulting in $K_{other}=1.762$. With $K_{same}=1$ the resulting $K_f$ for the IWBTC case is 2.762 for the 3-path case.

TABLE 2

| | | WBTC | | |
|---|---|---|---|---|
| Cell | Distance | Angle | $I_{1Cell,3-path}$ | $(d_j/R)^{-4} \times I_{1Cell,3-path}$ |
| 1 | R | 30° | 19.008 | 19.008 |
| 2 | 3R/√3 | 60° | 18.817 | 2.091 |
| 3 | R√7 | 11° | 16.851 | 0.3439 |
| 4 | 3R | 30° | 19.008 | 0.2347 |
| 5 | R√7 | 49° | 19.722 | 0.4025 |
| 6 | 3R/√3 | 0° | 16.551 | 1.839 |

Table 2. This table shows the three-path interference data for the IWBTC architecture of the 6 nearest cells. The cell numbers in column 1 correspond to the cell numbers of the IWBTC architecture in FIG. 1. The distance and angle columns represent the distance and angle from the cell's base station to the desired user (at the reference cell edge, 30° relative to the antenna array). The fourth column identifies the interference at the given angle to a user at distance R from it's base station and the last column calculates the interference to the desired user in the reference cell from the cell specified in column 1. The total other cell interference for this case is 23.919. With S=19.202, $K_{other=I/S=}1.246$.

TABLE 3

IWBTC

| Cell | Distance | Angle | $I_{1Cell,3-path}$ | $(d_j/R)^{-4} \times I_{1Cell,3\ path}$ |
|------|----------|-------|--------------------|------------------------------------------|
| 1 | 1R | 30° | 19.008 | 19.008 |
| 2 | 1.155R | 0° | 16.551 | 9.3 |
| 3 | 1.5275R | 47° | 19.722 | 3.623 |
| 4 | 2.65R | 11° | 16.851 | 0.3417 |
| 5 | 2.309R | 60° | 18.817 | 0.6615 |
| 6 | 2.0815R | 14° | 17.062 | 0.9089 |

Table 3. This table shows the three-path interference data for the IWBTC architecture of the reference cell (same cell) and the 6 nearest cells. The cell numbers in column 1 correspond to the cell numbers of the IWBTC architecture in FIG. 2. The distance and angle columns represent the distance and angle from the cell's base station to the desired user (at the reference cell edge, 30° relative to the antenna array). The fourth column identifies the interference at the given angle to a user at distance R from it's base station and the last column calculates the interference to the desired user in the reference cell from the cell specified in column 1. The total other cell interference for this case is 33.8431. With S=19.202, $K_{other}$=I/S=1.762.

The interference factors, $K_{same}$ and $K_{other}$ (or $K_f$) can be used in an interference equation developed for the single antenna case as follows. The total output power transmitted from the base station in the single antenna case is:

$$P_{total}=P_{pilot}+P_{sync}+N_p P_{paging}+(K_{traf}M_t+M_{ho})\alpha_f P_{traf} \quad (13)$$

where $P_{pilot}$ is the transmitter pilot channel power, $P_{sync}$ is the transmitter sync channel power, $P_{paging}$ is the transmitter paging channel power, $P_{traf}$ is the transmitter traffic channel power, $N_p$ is the number of active paging channels, $M_t$ is the number of active traffic channels, $M_{ho}$ is the number of other cell traffic channels used for soft handoff, $\alpha_f$ is the voice activity factor, and $K_{traf}$ is the power control factor. $P_{total}$ in equation (13) represents the total power transmitted from the base station in terms of the channels. Since the smart antenna output power is dependent on the DOA of each user, equation (13) can be adapted to the smart antenna array as:

$$P_{total}(\theta) = P_{pilot} + P_{sync} + N_p P_{paging} + \left(K_{traf}\sum_{n=1}^{M_t}\frac{|W^H(\theta)\underline{a}(\theta_n)|^2}{M_{ant}^2} + \sum_{n=1}^{M_{ho}}\frac{|W^H(\theta)\underline{a}(\theta_n)|^2}{M_{ant}^2}\right)\alpha_f P_{traf} \quad (14)$$

where $\theta$ is the angle at which we are calculating the power due to ($M_t+M_{ho}$) users, $\theta_n$ is the angle of the n-th user, and $P_{total}(\theta)$ is the power transmitted by the smart antenna at the base station at angle $\theta$. Equation (14) can be simplified by determining the average traffic channel power from an undesired user transmitted toward the desired user. The average interferer traffic channel power (ITCP) factor, $\epsilon$, can be defined as:

$$\varepsilon = \frac{\sum_{n=1}^{M_{users}}\frac{|W^H(\theta)\underline{a}(\theta_n)|^2}{M_{ant}^2}}{M_{users}} \quad (15)$$

where $M_{users}$ represents the number of users in a sector, $\theta$ represents the angle where the traffic channel power is accumulated from $M_{users}$, and $\theta_n$ represents the angle to user n. Equation (15) assumes that any angle, $\theta$, between −60° and +60° will experience the same traffic channel power for a given number of antenna elements. For simulation results presented in this invention, the users are assumed to be uniformly distributed at the cell edge for a worst case scenario with a large number of users. The ITCP will then represent a factor independent of the number of users. Applying the ITCP to equation (14) results in:

$$\bar{P}_{total}=P_{pilot}+P_{sync}+N_p P_{paging}+(K_{traf}(1+\epsilon(M_t-1))+\epsilon M_{ho})\alpha_f P_{traf} \quad (16)$$

where the angle is now removed since the average total power is independent of the DOA. The reason for the term $K_{traf}(1+\epsilon(M_t-1))$ is because the desired user is accounted for with the "1", all other undesired users not in the soft handoff region are accounted for in $\epsilon(M_t-1)$, and all other undesired users in soft handoff are accounted for in $\epsilon M_{ho}$. $K_{traf}$ does not apply for the $\epsilon M_{ho}$ term because these users are power controlled by some other base station.

To find the power arriving at the mobile from the base station, equation (16) may be used with the appropriate processing gains and losses applied. For example, $$\left(\frac{E_b}{N_{0,T}}\right)_{traf} = \frac{PG_{traf}P_{traf}}{N_m L_T(R) + K_f \bar{P}_{total}} = \rho_{traf} \quad (17)$$

where $E_b/N_{0,T}$ is the bit energy to noise power density required at the mobile, $PG_{traf}$ is the processing gain of the traffic channel, $P_{traf}$ is the transmitted traffic channel power, $N_m$ is the mobile receiver's thermal noise power, $L_T(R)$ is the total free space loss to the mobile at distance R, and $K_f$ is the interference factor (the sum of $K_{same}$ and $K_{other}$). The processing gain can be calculated for a channel using:

$$PG = \frac{W}{R_b} \quad (18)$$

where W is the bandwidth of the signal and $R_b$ is the bit rate. Assuming the bit rates are 1.2288 Mbps, 1200 bps, 4800 bps, and 9600 bps, the values of the processing gain are 1, 1024, 256, and 128 for the pilot, sync, paging, and traffic channels, respectively. Applying equation (17) to equation (16) results in a traffic channel power solution of:

$$P_{traf} = \frac{N_m L_T(R)\frac{\rho_{traf}}{PG_{traf}}}{1 - K_f\left(\rho_{pil} + \frac{\rho_{sync}}{PG_{sync}} + N_p\frac{\rho_{pag}}{PG_{pag}} + \left(K_{traf} + \frac{M_{ho}\varepsilon}{1+(M_t-1)\varepsilon}\right)(1+\varepsilon(M_t-1))\alpha_f\frac{\rho_{traf}}{PG_{traf}}\right)} \quad (19)$$

With the numerators of the channel power solutions remaining constant, the key to the forward link capacity lies in the denominator since it contains the only terms relating to the number of users in the system. For all channel powers, the common denominator is:

$$1 - K_f\left(\rho_{pil} + \frac{\rho_{sync}}{PG_{sync}} + N_p\frac{\rho_{pag}}{PG_{pag}} + \left(K_{traf} + \frac{M_{ho}\varepsilon}{1+(M_t-1)\varepsilon}\right)(1+\varepsilon(M_t-1))\alpha_f\frac{\rho_{traf}}{PG_{traf}}\right).$$

This denominator must be greater than zero. Since $M_t \gg 1$ and $\varepsilon > 0$, one simplification that can be made to this is to assume:

$$\frac{M_{ho}\varepsilon}{1+(M_t-1)\varepsilon} \approx \frac{M_{ho}}{M_t} \quad (21)$$

where $M_{ho}$ represents the number of users in soft handoff and $M_{ho}/M_t$ represents the percentage of users in soft handoff. Assuming a uniform distribution of users, this also represents the percentage of a sector's area that is in soft handoff. Adding $K_{traf}$ to equation (21) results in:

$$K_{traf} + \frac{M_{ho}\varepsilon}{1+(M_t-1)\varepsilon} \approx K_{traf} + \frac{M_{ho}}{M_t} = K'_{traf}. \quad (22)$$

Using equation (22), equation (20) becomes:

$$1 - K_f\left(\rho_{pil} + \frac{\rho_{sync}}{PG_{sync}} + N_p\frac{\rho_{pag}}{PG_{pag}} + K'_{traf}(1+\varepsilon(M_t-1))\alpha_f\frac{\rho_{traf}}{PG_{traf}}\right) > 0. \quad (23)$$

From this denominator, there results a singularity when the power reaches a threshold. This translates into a limitation on the number of supportable users. One way to show this is to compute the asymptotic capacity by solving for $M_t$. The above equation becomes equal when we consider the upper bound, which can be called $M_\infty$ as follows:

$$M_\infty = \quad (24)$$

$$\frac{PG_{traf}}{K'_{traf}\varepsilon\alpha_f\rho_{traf}}\left[\frac{10^{-M_{dB}/10}}{K_f} - \frac{\rho_{pil}}{PG_{pil}} - \frac{\rho_{sync}}{PG_{sync}} - N_p\frac{\rho_{pag}}{PG_{pag}}\right] - \frac{1}{\varepsilon} + 1$$

where the numeric values of the processing gain have been included, and $M_{dB}$ is the margin and it represents the additional amount of traffic channel power required to meet a specified link reliability. In equation (20) $M_{dB}$ was not shown because it was assumed to be zero. Margin is necessary to overcome shadowing at the cell edge. The capacity presented here allows one to determine the capacity for margins between 0 dB and 3 dB.

If the numeric values of the processing gain are included, equation (24) may be rewritten as follows:

$$M_\infty = \frac{128}{K'_{traf}\varepsilon\alpha_f\rho_{traf}}\left[\frac{10^{-M_{dB}/10}}{K_f} - \rho_{pil} - \frac{\rho_{sync}}{1024} - N_p\frac{\rho_{pag}}{256}\right] - \frac{1}{\varepsilon} + 1 \quad (25)$$

Figure 6:
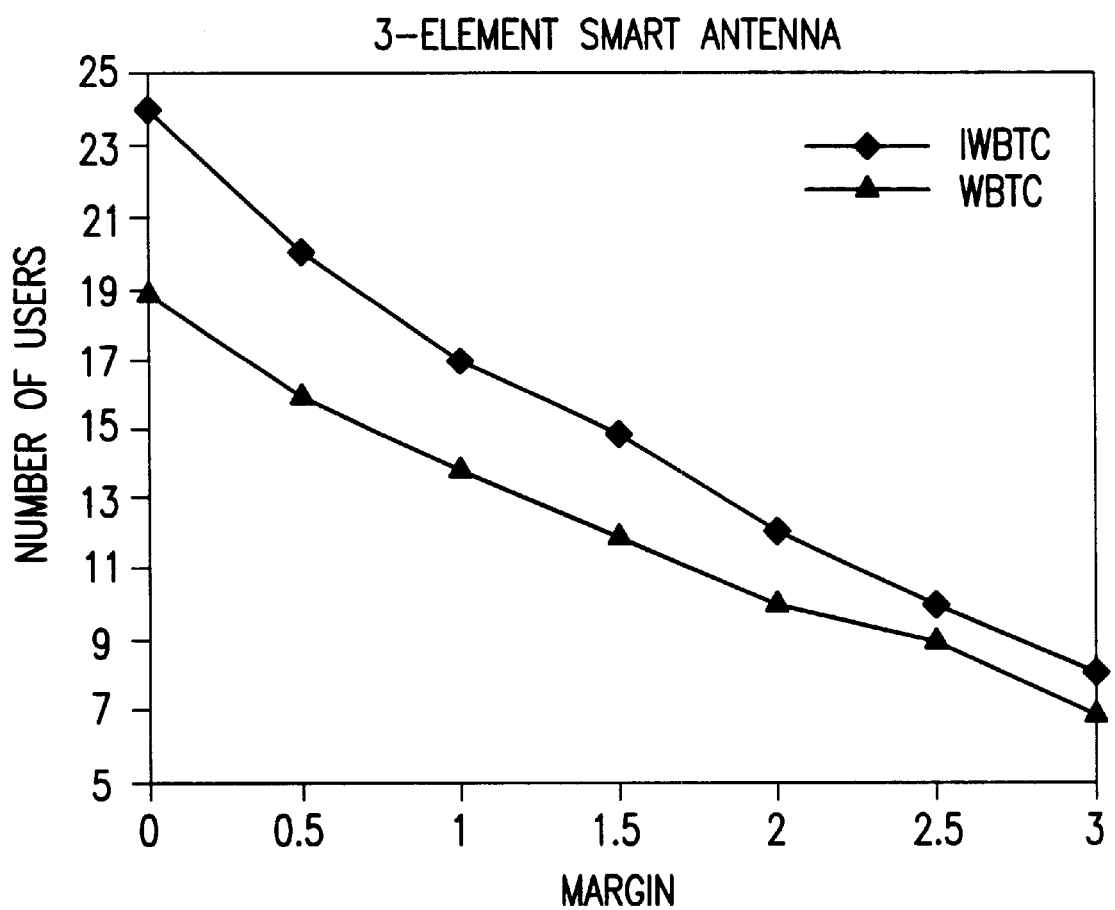
FIG. 6 is a graph showing the capacity improvement of the IWBTC architecture over the WBTC architecture for a 3 element smart antenna array.
Figure 7:
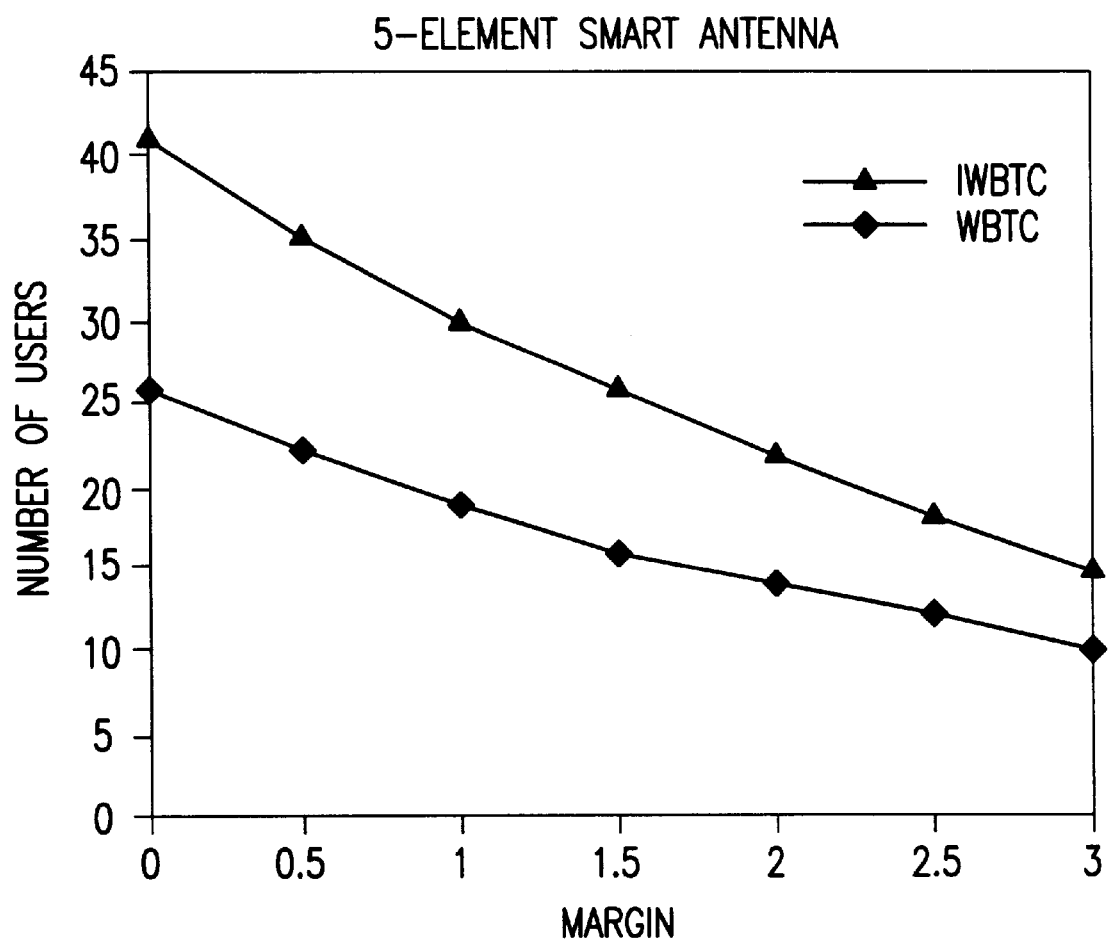
FIG. 7 is a graph showing the capacity improvement of the IWBTC architecture over the WBTC architecture for a 5 element smart antenna array.
Figure 8:
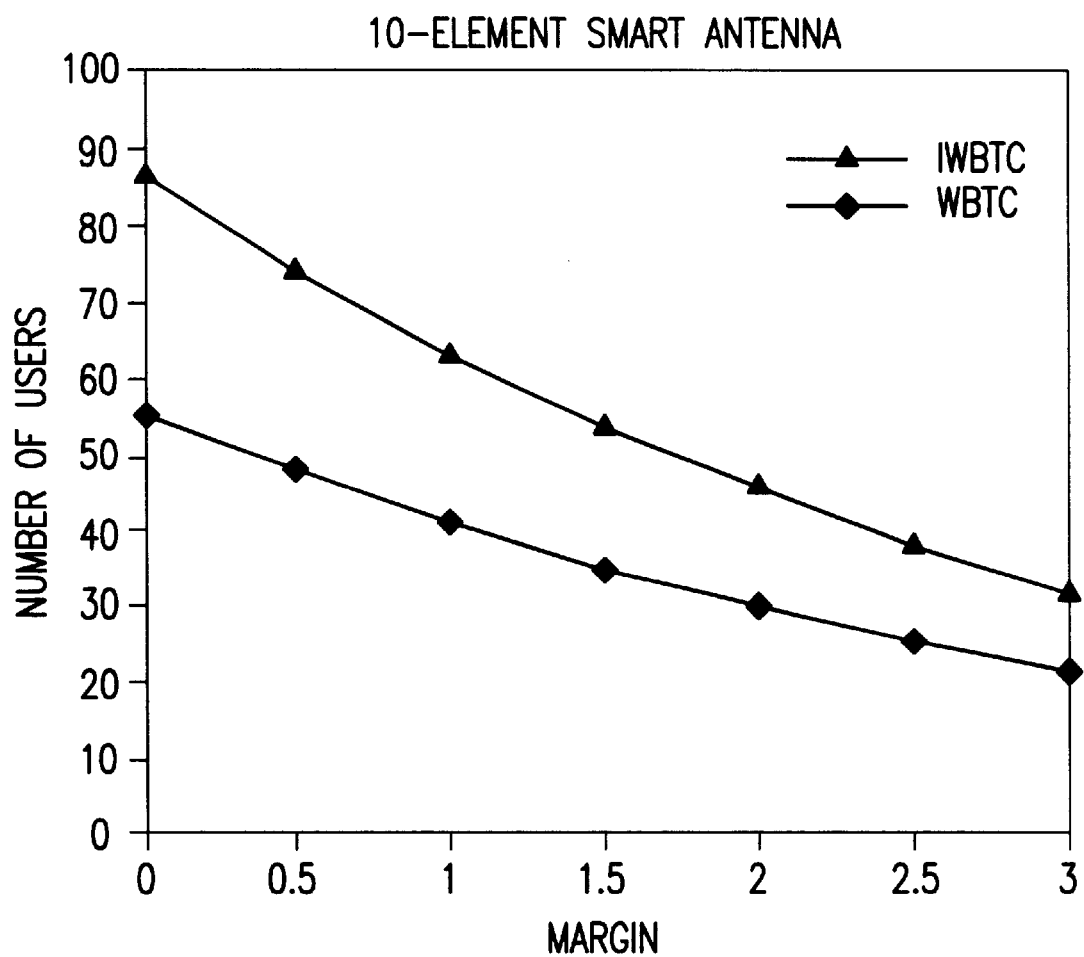
FIG. 8 is a graph showing the capacity improvement of the IWBTC architecture over the WBTC architecture for a 10 element smart antenna array.

Equation (24) can be called the forward link asymptotic capacity. It represents the maximum capacity achievable with any specified set of channel powers. Using equation (24) the forward link capacity may be plotted under different conditions. The following is a discussion of the results of the simulation plotted in FIGS. 6–8 showing the capacity verses margin for different interference factors and soft handoff sizes.

For all results presented, the numeric processing gains from equation 25 and the following values from equation (24) are used: $K_{traf} = 0.5$, $\alpha_f = 0.4$, $\rho_{traf} = 7$ dB, $\rho_{pil} = -15$ dB, $\rho_{sync} = 6$ dB, $\rho_{pag} = 6$ dB, and $N_p = 1$. The first parameter to determine is the other cell interference, $K_{other}$, and the resulting $K_f$. FIG. 6 shows the capacity results for a 3 element smart antenna array system. The IWBTC architecture results in a greater capacity than the IWBTC system primarily due to the improved soft handoff region. FIGS. 7 and 8 show similar results for the 5 and 10 element smart antenna array case, respectively. Again, the IWBTC architecture achieves superior results. The methods discussed above may be used to calculate the asymptotic capacity in connection with any computer system including a processor, a memory connected to the processor, and an input/output device or devices connected to the processor.

As discussed above, it has been shown that the total signal strength received by a mobile user will be increased if the transmission from the smart antenna, rather than being directed to the user solely along the primary multipath, is directed along the primary multipath and a secondary and tertiary multipath. The secondary multipath is the multipath other than the primary multipath on which the strongest signal is received from the mobile user, while the tertiary multipath is the multipath other than the primary and secondary multipaths on which the strongest signal is received from the mobile user. It will normally, but not necessarily, be the case that the tertiary and secondary multipaths are on opposite sides of the primary multipaths. Furthermore, the angle formed between the primary and secondary multipaths will normally, but not necessarily, be equal to the angle formed by the primary and tertiary multipaths. In preferred embodiments, the transmission occurs on all three multipaths simultaneously.

Obviously, numerous modifications and variations of the present invention are possible in light of the above teachings. It is therefore to be understood that within the scope of the appended claims, the invention may be practiced otherwise than as specifically described herein.

What is claimed is:

1. A method for evaluating the performance of a cellular system, the method comprising the steps of:

calculating a forward link-other cell interference factor $K_{other}$;

calculating a interference traffic channel power factor $\varepsilon$; and calculating a asymptotic capacity $M_\infty$ based on the forward link-other cell interference factor and the interference traffic channel power factor;

wherein the asymptotic capacity $M_\infty$ is calculated according to the following equation:

$$M_\infty = \frac{PG_{traf}}{K'_{traf}\varepsilon\alpha_f\rho_{traf}}\left[\frac{10^{-M_{dB}/10}}{K_f} - \frac{\rho_{pil}}{PG_{pil}} - \frac{\rho_{sync}}{PG_{sync}} - N_p\frac{\rho_{pag}}{PG_{pag}}\right] - \frac{1}{\varepsilon} + 1$$

wherein $PG_{traf}$ is a traffic channel processing gain;

$P_{traf}$ is a transmitted traffic channel power;

$PG_{sync}$ is a sync channel processing gain;
$P_{sync}$ is a transmitted sync channel power;
$PG_{paging}$ is a paging channel processing gain;
$P_{paging}$ is a transmitted paging channel power;
$PG_{pil}$ is a pilot channel processing gain;
$P_{pil}$ is a transmitted pilot channel power;
$K'_{traf}$ is a modified power control factor that includes soft handoff effects;
$K_f$ is an interference factor, which is equal to $K_{same}$ plus $K_{other}$;
$\epsilon$ is an interference traffic channel power;
$M_{dB}$ is a margin; and
$\alpha_f$ is a voice activity factor.

2. A method for evaluating the performance of a cellular system, the method comprising the steps of:
calculating a forward link-other cell interference factor $K_{other}$;
calculating a interference traffic channel power factor $\epsilon$; and
calculating a asymptotic capacity $M_\infty$ based on the forward link-other cell interference factor and the interference traffic channel power factor;
wherein the forward link other-cell interference factor $K_{other}$ is calculated according to the following equation:

$$\frac{I_{oc,SA}}{S(\theta_{sc})} = \sum_i \frac{P(\theta_{oc})r^\gamma}{P(\theta_{sc})r_i^\gamma(r, d_i, \theta_i)} = K_{other}$$

in which
$I_{oc,SA}$ is the other cell channel interference for a smart antenna array;
$S(\theta_{sc})$ is the total forward link power received at a mobile unit from a reference cell without interference;
$P(\theta_{oc})$ is the transmitted forward link power from an other cell at an angle $\theta_{oc}$ from the other cell to a desired user relative to its antenna array;
r is a distance from an other cell to the reference cell;
$\gamma$ is a power law;
$P(\theta_{sc})$ is the transmitted forward link power from the reference cell and;
$r_i(r, d_i, \theta_i)$ is a distance from an i-th base station.

3. A method for making a communication system comprising the steps of:
providing a plurality of antenna assemblies, each of the antenna assemblies having three sides, each of the antenna assemblies having an orientation, each of the sides having an array of antenna elements;
connecting each of the antenna assemblies to a code division multiple access transceiver;
arranging the antenna assemblies in a pattern such that each of the antenna assemblies are substantially aligned along one of a plurality of parallel lines in a first direction at a substantially regularly spaced interval, each of the antenna assemblies on a single line in the first direction having a substantially same orientation as other antenna assemblies on the single line, each of the antenna assemblies along adjacent parallel lines being staggered with respect to a nearest neighboring antenna assembly in a second direction different from the first direction such that the second direction forms an angle of approximately 10.89 degrees with respect to a direction perpendicular to the first direction, thereby reducing a size of a soft handoff region; and
evaluating the performance of the system by calculating a forward link-other cell interference factor $K_{other}$, calculating an interference traffic channel power factor $\epsilon$, and calculating an asymptotic capacity $M_\infty$ based on the forward link-other cell interference factor $K_{other}$ and the interference traffic channel power factor $\epsilon$.

4. The method of claim 3, wherein the asymptotic capacity $M_\infty$ is calculated according to the following equation:

$$M_\infty = \frac{PG_{traf}}{K'_{traf}\epsilon\alpha_f p_{traf}}\left[\frac{10^{-M_{dB}/10}}{K_f} - \frac{\rho_{pil}}{PG_{pil}} - \frac{\rho_{sync}}{PG_{sync}} - N_p\frac{\rho_{pag}}{PG_{pag}}\right] - \frac{1}{\epsilon} + 1$$

wherein
$PG_{traf}$ is a traffic channel processing gain;
$P_{traf}$ is a transmitted traffic channel power;
$PG_{sync}$ is a sync channel processing gain;
$P_{sync}$ is a transmitted sync channel power;
$PG_{paging}$ is a paging channel processing gain;
$P_{paging}$ is a transmitted paging channel power;
$PG_{pil}$ is a pilot channel processing gain;
$P_{pil}$ is a transmitted pilot channel power;
$K'_{traf}$ is a modified power control factor that includes soft handoff effects;
$K_f$ is an interference factor, which is equal to $K_{same}$ plus $K_{other}$;
$\epsilon$ is an interference traffic channel power;
$M_{dB}$ is a margin; and
$\alpha_f$ is a voice activity factor.

5. The method of claim 3, wherein the forward link other-cell interference factor $K_{other}$ is calculated according to the following equation:

$$\frac{I_{oc,SA}}{S(\theta_{sc})} = \sum_i \frac{P(\theta_{oc})r^\gamma}{P(\theta_{sc})r_i^\gamma(r, d_i, \theta_i)} = K_{other}$$

in which
$I_{oc,SA}$ is the other cell channel interference for a smart antenna array;
$S(\theta_{sc})$ is the total forward link power received at a mobile unit from a reference cell without interference;
$P(\theta_{oc})$ is the transmitted forward link power from an other cell at an angle $\theta_{oc}$ from the other cell to a desired user relative to its antenna array;
r is a distance from an other cell to the reference cell;
$\gamma$ is a power law;
$P(\theta_{sc})$ is the transmitted forward link power from the reference cell and;
$r_i(r, d_i, \theta_i)$ is a distance from an i-th base station.

6. The method of claim 3, wherein the interference traffic channel power factor $\epsilon$ is calculated according to the following equation:

$$\epsilon = \frac{\sum_{n=1}^{M_{users}}\frac{|\underline{W}^H(\theta)\underline{a}(\theta_n)|^2}{M_{ant}^2}}{M_{users}}.$$

wherein
$M_{users}$ is a number of users in a sector;
$W^H(\theta)$ is a Hermitian of a weight vector for a smart antenna array at a desired direction of arrival angle $\theta$;

θ_n is a direction of arrival angle for an undesired signal n; and $M_{ant}$ is a number of antenna elements.

7. The method of claim 3, wherein each of the antenna assemblies further comprises at least one code division multiple access transceiver.

8. A method for making a communication system comprising the steps of:
provide a plurality of antenna assemblies, each of the antenna assemblies having three sides, each of the antenna assemblies having an orientation, each of the sides having an array of antenna elements;
connecting each of the antenna assemblies to a code division multiple access transceiver;
arranging the antenna assemblies in a pattern such that each of the antenna assemblies are substantially aligned along one of a plurality of parallel lines in a first direction at a substantially regularly spaced interval, each of the antenna assemblies on a single line in the first direction having a substantially same orientation as other antenna assemblies on the single line, each of the antenna assemblies along adjacent parallel lines being staggered with respect to a nearest neighboring antenna assembly in a second direction different from the first direction such that the second direction forms an angle of approximately 10.89 degrees with respect to a direction perpendicular to the first direction; and
evaluating the performance of the system by calculating a forward link-other cell interference factor $K_{other}$, calculating an interference traffic channel power factor $\epsilon$, and calculating an asymptotic capacity $M_\infty$ based on the forward link-other cell interference factor $K_{other}$ and the interference traffic channel power factor $\epsilon$.

9. A method for evaluating the performance of a cellular system, the method comprising the steps of:
calculating a forward link-other cell interference factor $K_{other}$;
calculating a interference traffic channel power factor $\epsilon$; and
calculating a asymptotic capacity $M_\infty$ based on the forward link-other cell interference factor and the interference traffic channel power factor;
wherein the interference traffic channel power factor $\epsilon$ is calculated according to the following equation:

$$\varepsilon = \frac{\sum_{n=1}^{M_{users}} \frac{|\underline{W}^H(\theta)\underline{a}(\theta_n)|^2}{M_{ant}^2}}{M_{users}}$$

wherein
$M_{users}$ is a number of users in a sector;
$W^H(\theta)$ is a Hermitian of a weight vector for a smart antenna array at a desired direction of arrival angle θ;
$a(\theta_n)$ is the array response vector for an undesired signal n at a direction of arrival $\theta_n$; and
$M_{ant}$ is a number of antenna elements.

10. A cellular system comprising:
a plurality of antenna arrays, each of the arrays having three sides, each of the arrays having an orientation; and
a plurality of transmitters, each of the transmitters being connected to a respective array, each of the transmitters being configured to transmit on a same frequency range;
wherein the arrays are arranged in a pattern such that each of the arrays are substantially aligned along one of a plurality of parallel lines in a first direction at a substantially regularly spaced interval, each of the arrays on a single line in the first direction having a substantially same orientation as other arrays on the single line, each of the arrays along adjacent parallel lines being staggered with respect to a nearest neighboring array in a second direction different from the first direction such that the second direction forms an angle of approximately 10.89 degrees with respect to a direction perpendicular to the first direction;
wherein each of the arrays is rotated by approximately sixty degrees with respect to a direction perpendicular to the first direction; and
wherein each of the arrays comprises a smart antenna array and the smart antenna array is configured to direct a transmission to a mobile user along three different multipaths.

11. The cellular system of claim 10, wherein a first multipath corresponds to a direction from which a strongest signal is received from the mobile user, a second multipath corresponds to a direction on which a strongest signal other than a signal on the first multipath is received from the mobile user, and a third multipath corresponds to a direction on which a strongest signal other than a signal on the first and second multipaths is received from the mobile user.

12. The cellular system of claim 11, wherein approximately fifty percent of a total signal to be transmitted to the mobile user is transmitted along the first multipath, and approximately twenty five percent of the total signal is transmitted on each of the second and third multipaths.

13. A cellular system comprising:
a plurality of code division multiple access transmitters; and
a plurality of antenna arrays, each of the arrays having three sides, each of the arrays having an orientation, each of the arrays being connected to a respective code division multiple access transmitter;
wherein the arrays are arranged in a pattern such that each of the arrays are substantially aligned along one of a plurality of parallel lines in a first direction at a substantially regularly spaced interval, each of the arrays on a single line in the first direction having a substantially same orientation as other arrays on the single line, each of the arrays along adjacent parallel lines being staggered with respect to a nearest neighboring array in a second direction different from the first direction such that the second direction forms an angle of approximately 10.89 degrees with respect to a direction perpendicular to the first direction, thereby reducing a size of a soft handoff region.

14. The cellular system of claim 13, further comprising:
a base station connected to at least one of the plurality of antenna arrays, the base station being configured to perform the steps of: determining a first direction in which a strength of a received signal from a mobile user is greatest;
determining a second direction in which a strength of a received signal from a mobile user is greater than received signal strength in directions other than the first direction;
determining a third direction in which a strength of a received signal from a mobile user is greater than received signal strength in directions other than the first and second directions;
configuring the array to transmit a first portion of a total power in the first direction, transmit a second portion of the total power in the second direction, and transmit a third portion of the total power in the third direction.

15. The system of claim 14, wherein approximately fifty percent of the total power is transmitted in the first direction, approximately twenty five percent of the total power is transmitted in the second direction, and approximately twenty five percent of the total power is transmitted in the third direction.

16. The system of claim 14, wherein the first portion, the second portion and the third portion are transmitted substantially simultaneously.

17. The system of claim 14, wherein the arrays comprise smart antenna arrays.

18. The cellular system of claim 13, wherein each of the arrays is rotated by approximately sixty degrees with respect to the nearest neighboring array in the second direction.

19. The cellular system of claim 3, wherein each of the transmitters is configured to transmit on the same frequency range.

20. The cellular system of claim 13, wherein each of the arrays comprises a smart antenna array.

21. The cellular system of claim 20, wherein the smart antenna array is configured to direct a transmission to a mobile user along three different multipaths.

22. The cellular system of claim 13, wherein each of the arrays comprises a wide beam antenna.

23. A method for transmitting to a mobile user in a cellular system comprising the steps of:
   determining a first direction in which a strength of a received signal from a mobile user is greatest;
   determining a second direction in which a strength of a received signal from a mobile user is greater than directions other than the first direction;
   determining a third direction in which a strength of a received signal from a mobile user is greater than directions other than the first and second directions;
   transmitting a first portion of a total power of a signal to be transmitted to the mobile user in the first direction;
   transmitting a second portion of the total power in the second direction; and
   transmitting a third portion of the total power in the third direction.

24. The method of claim 23, wherein approximately fifty percent of the total power is transmitted in the first direction, approximately twenty five percent of the total power is transmitted in the second direction, and approximately twenty five percent of the total power is transmitted in the third direction.

25. The method of claim 23, wherein the transmitting steps are performed substantially simultaneously.

26. The method of claim 23, wherein the transmitting steps are performed using a smart antenna.

27. A cellular system comprising:
   a plurality of antenna assemblies, each of the assemblies having three sides, each of the assemblies having an orientation, each of the sides including a smart antenna array;
   wherein the assemblies are arranged in a pattern such that each of the assemblies are substantially aligned along one of a plurality of parallel lines in a first direction at a substantially regularly spaced interval, each of the assemblies on a single line in the first direction having a substantially same orientation as other assemblies on the single line, each of the assemblies along adjacent parallel lines being staggered with respect to a nearest neighboring assembly in a second direction different from the first direction such that the second direction forms an angle of approximately 10.89 degrees with respect to a direction perpendicular to the first direction, thereby reducing a size of a soft handoff region.

28. A method for making a cellular system comprising the steps of:
   dividing a service area into a plurality of cells, each of the cells having three sectors, each of the sectors having a shape of a hexagon, each of the sectors having a side adjacent to a side of each other sector in the same cell;
   providing a plurality of antenna assemblies;
   placing an antenna assembly at approximately a center of each cell to reduce a soft handoff area; and
   connecting a code division multiple access transmitter to each antenna assembly.

29. The method of claim 28, wherein the assemblies are arranged in a pattern such that each of the assemblies are substantially aligned along one of a plurality of parallel lines in a first direction at a substantially regularly spaced interval, each of the assemblies on a single line in the first direction having a substantially same orientation as other assemblies on the single line, each of the assemblies along adjacent parallel lines being staggered with respect to a nearest neighboring assembly in a second direction different from the first direction such that the second direction forms an angle of approximately 10.89 degrees with respect to a direction perpendicular to the first direction.

30. The method of claim 28, wherein each antenna assembly has a first orientation and further comprising the step positioning the antenna assemblies such that at least some of the assemblies have a first neighboring assembly at the first orientation and a second neighboring assembly at a second orientation differing by approximately sixty degrees from the first orientation.

31. The method of claim 28, wherein each antenna assembly has an orientation and further comprising the step of positioning, each antenna assembly in a same orientation.

32. The method of claim 28, wherein each of the assemblies comprises a smart antenna array.

33. The method of claim 32, wherein the assemblies are arranged in a pattern such that each of the assemblies are substantially aligned along one of a plurality of parallel lines in a first direction at a substantially regularly spaced interval, each of the assemblies on a single line in the first direction having a substantially same orientation as other assemblies on the single line, each of the assemblies along adjacent parallel lines being staggered with respect to a nearest neighboring assembly in a second direction different from the first direction such that the second direction forms an angle of approximately 10.89 degrees with respect to a direction perpendicular to the first direction.

34. The method of claim 32, wherein each antenna assembly has a first orientation and further comprising the step positioning the antenna assemblies such that at least some of the assemblies have a first neighboring assembly at the first orientation and a second neighboring assembly at a second orientation differing by approximately sixty degrees from the first orientation.

35. The method of claim 32, wherein each antenna assembly has an orientation and further comprising the step of positioning each antenna assembly at a same orientation.

36. The method of claim 32, wherein each antenna assembly comprises three smart antenna arrays.

37. The method of claim 36, wherein each smart antenna array comprises three elements.

38. The method of claim 36, wherein each smart antenna array comprises five elements.

39. The method of claim 36, wherein each smart antenna array comprises ten elements.

* * * * *